United States Patent [19]

Schmidt

[11] 4,258,250
[45] Mar. 24, 1981

[54] JAM DETECTOR

[75] Inventor: Stephen R. Schmidt, Chicago, Ill.

[73] Assignee: Copar Corporation, Oak Lawn, Ill.

[21] Appl. No.: 937,938

[22] Filed: Aug. 30, 1978

[51] Int. Cl.³ ............................................. G06M 3/02
[52] U.S. Cl. .......................... 235/92 PE; 235/92 FP; 235/92 DN; 235/92 V; 235/92 SB
[58] Field of Search ............. 235/92 PE, 92 FP, 92 V, 235/92 DN, 92 SB, 92 CT; 340/674, 676

[56] References Cited

U.S. PATENT DOCUMENTS

| | | | |
|---|---|---|---|
| 3,150,873 | 9/1964 | MacGregor | 340/674 |
| 3,659,081 | 4/1972 | Piccione | 235/92 PE |
| 3,779,440 | 12/1973 | Casale et al. | 235/92 SB |

*Primary Examiner*—Joseph M. Thesz
*Attorney, Agent, or Firm*—Kinzer, Plyer, Dorn & McEachran

[57] ABSTRACT

A system for use in detecting jams in a series of members of defined length which are moving along a predetermined path includes a pulse generator for providing sequential pulses, each representative of a unit of length. A counter having a preset number therein representative of the defined length of a member plus an additional fixed length substantially less than that of a member receives an input from the pulse generator and from a sensor positioned adjacent the path of movement. During the period that a member is sensed, the preset count in the counter is reduced by the pulse generating means and if that count is reduced to zero, a jam condition is indicated and means are provided to stop movement of the members.

4 Claims, 2 Drawing Figures

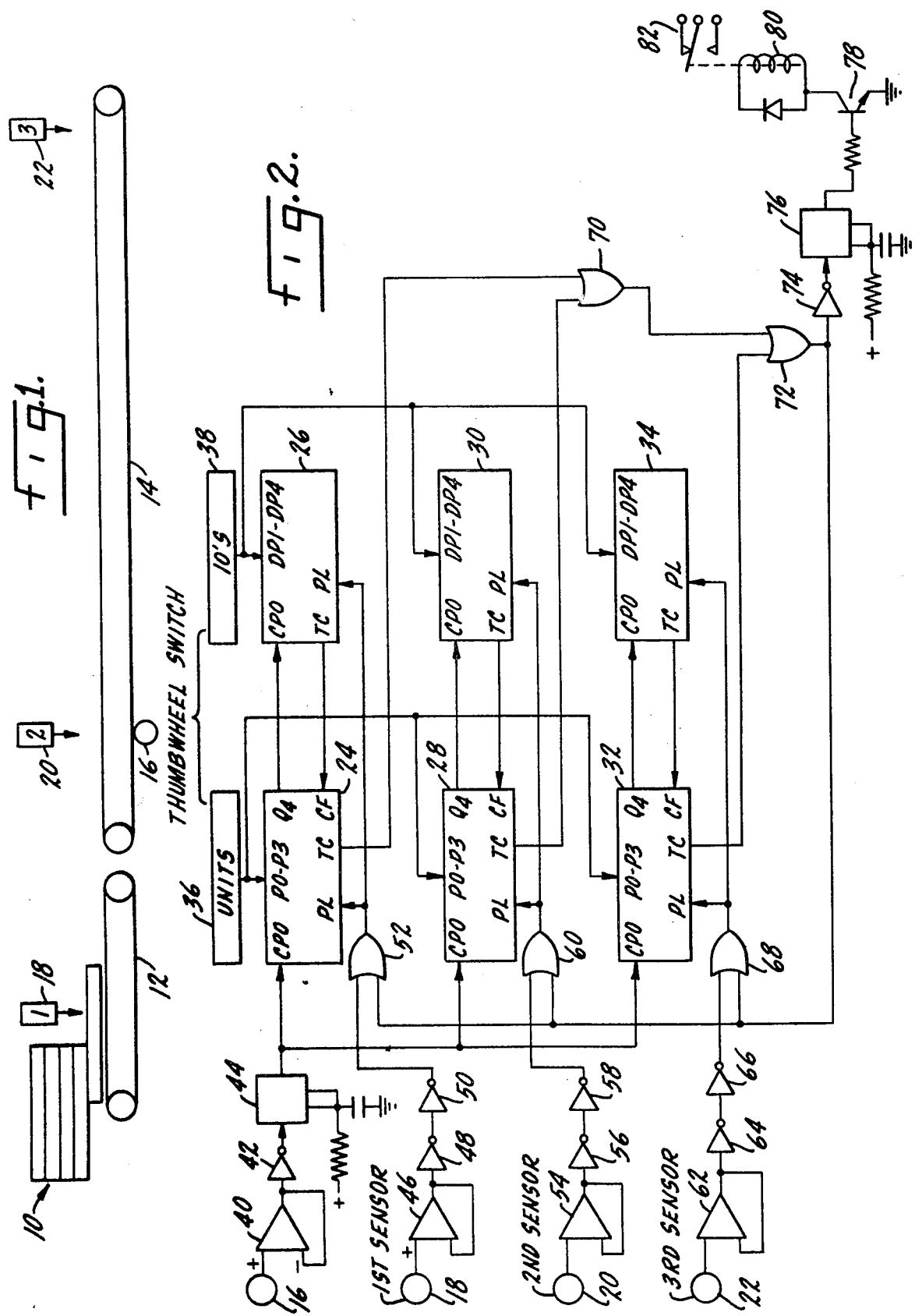

JAM DETECTOR

SUMMARY OF THE INVENTION

The present invention relates to jam detectors for use with machines processing corrugated board or the like.

One purpose of the invention is a jam detector designed for use with "stream fed" machines in which a continuous series of box blanks are fed through machines performing operations on such blanks.

Another purpose is a jam detector utilizing a counter, a pulse generator and a sensing means, with the count in the counter being representative of the length of the boards being processed and being reduced by the pulse generator during the period that a board is detected by said sensing means.

Another purpose is a simply constructed reliably operable jam detector of the type described.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a portion of a corrugated board operation showing location of the jam detector relative to the board conveyors, and FIG. 2 is an electric schematic of the jam detector disclosed herein.

DESCRIPTION OF THE PREFERRED EMBODIMENT

The present invention relates to a system for detecting a jam condition in the manufature of corrugated boxes and in particular to a jam detector for stream-fed equipment in which box blanks are removed from a stack by a feed belt and them subsequently moved by a second conveyor to various stations where the box may be printed, cut, folded or the like. A stream-fed machine, in contrast to a synchronous machine in which a box blank is fed each time a machine passes through a predetermined portion of or an entire revolution, continuously removes box blanks from a stack and there is no timed sequence to the position of the blanks on the conveyor belt.

Looking at FIG. 1, a stack a box blanks is indicated diagrammatically at 10. A belt 12 is positioned beneath the stack of blanks 10 and is arranged to continuously remove the bottom blank from the stack. The stack is so arranged that the leading edge of the bottom blank will contact the feed belt and thus the blanks will be sequentially pulled away from the stack by the feed belt 12. Directly adjacent belt 12 is a second conveyor belt 14 which will be running at a slightly higher speed than that of belt 12. The difference in speed will provide a predetemined space between the blanks as they move on belt 12 to various work stations. When the blanks are removed from stack 10 by belt 12, they will essentially be directly adjacent or actually in contact with each other on an end-to-end basis. The differential speed or higher speed of belt 14 will provide predetermined spacing between the blanks.

A pulse generator 16 is positioned directly beneath and in contact with belt 14 and will provide pulses representative of movement of the belt. A convenient arrangement will provide one pulse of each inch of belt travel.

Three sensing stations are illustrated in FIG. 1. A feed sensor 18, which may be a photoelectric cell, is positioned directly above belt 12. A folding sensor 20 is positioned adjacent one end and above belt 14 and again may be a photoelectric type of device. A squaring sensor 22 is positioned above and at the end of belt 14. The invention should not be limited to any particular number or disposition of sensing devices nor to any particular type of sensing device. Photoelectric devices have been found to be satisfactory. The number and positioning of the devices will depend upon the particular operations to be performed on the blanks as they move through the overall boxmaking machinery.

In FIG. 2 a group of presettable countdown counters, which may be 4522Bs manufactured by Motorola are indicated at 24-34. Each of these units may have a thumbwheel switch or there may be a common switching arrangement as shown herein whereby a particular number may be set into the counters. The thumbwheel switches, one for units and one for tens, are indicated at 36 and 38. The counters are arranged in pairs with counters 24 and 26 being the unit and tens counters of one pair and pairs 28 and 30 and 32 and 34 being arranged in like manner.

Pulse generator 16 is shown connected to the plus input of an operational amplifier 40. The output from amplifier 40 is connected through an inverter 42, which may be a Schmitt trigger, to the input of a timing circuit 44. The output from the timing circuit is connected to the CPO input of counter 24 as well as to the same input of counters 28 and 32. Thus, the pulse generator output, a series of pulses indicative of length of travel of the conveyor belt, is fed to the input of one counter in each pair or set.

Sensor 18 is connected to the plus input of an operational amplifier 46 whose output passes successively through inverters 48 and 50 and then to one input of OR gate 52 whose output is connected to the PL input of both counters 24 and 26. The PL input functions as the reset input for both counters.

In like manner, sensor 20 is connected to an operational amplifier 54 which has its output connected through inverters 56 and 58 to one input of an OR gate 60. The output from OR gate 60 is connected to the PL inputs of counters 28 and 30.

Sensor 22 is connected to an operational amplifier 62 whose output is connected through inverters 64 and 66 to an OR gate 68. The output from OR gate 68 is connected to the PL input of counters 32 and 34.

Each pair of counters is cross connected with the Q4 output of the units counter being connected to the CPO input of the tens counter. In like manner, the TC output of the tens counter is connected to the CF input of the units counter. The TC output of units counters 24, 28 and 32 are connected respectively to OR gates 70 and 72 with the output from OR gate 72 being connected through an inverter 74 to a timer 76. The output from timer 76 is connected to the base of transistor 78 with the collector being connected to operate coil 80 of a relay 82. Relay 82, when a jam condition is determined, as will appear hereinafter, will be operated to stop movement of the conveyors.

The output from OR gate 72 is also connected to one input of OR gates 52, 60 and 68, and thus to the reset inputs of each counter.

Assuming that the box blanks moving through the coveyor system are 40 inches long, and this is merely an illustrative example, the counting pairs or sets will have a preset number therein which is slightly larger than 40 inches, for example 41 or 42 inches. For purposes of description a one-inch measurement will be used so that each of the counters will be set for 41 inches. Pulses from pulse generator 16 are continually passing through the described operational amplifier and inverter to timer 44 which will provide pulses at precisely timed intervals. These pulses will each be fed to the CPO input of the units counter in each set. Whenever the photosensor associated with a particular counting set sees a box blank, a signal from that photosensor, for example photosensor 18, will pass to OR gate 52 so that the output from gate 52 will permit the pulses from pulse generator 60 to be received in the counting set and to begin a countdown process. The tens and unit counters are connected in cascade with the end result that the preset number will be reduced by one for each pulse received. Since the counter has been set for 41 and the box blanks are 40 inches in length, the count should not be reduced to zero before the photosensor detects the absence of a blank which changes the condition of OR gate 52 and thereby causes the counter to be reset to its original number. This would be indicative of normal operation, as the blank would have passed the sensing station without being stopped. All three sensing stations operate in the same manner.

If the count in a counting set is reduced to zero, which can only be indicative of a blank not moving past the sensing station in the required manner, indicating a jam condition, then there will be an output from the TC terminal of that particular counter and consequently an output from OR gate 72 to inverter 74 and timer 76. This will cause operation of relay 82 which will stop the conveyors. At the same time OR gates 52, 60 and 68 will receive a signal from OR gate 72 which will place them in a condition to reset the counters.

The disclosed circuitry provides a simple and reliable means for detecting jam conditions in boxmaking machinery or in other types of operations in which a series of members continuously pass through a succession of work stations. Each of the counters is set for a number greater than the length of the members passing the work station. The amount by which the counter is set greater than the length will be determined by the speed of operation of the equipment. Under normal operating conditions, i.e. no jam, the counters will not be reduced to zero. In a jam condition, and there is a margin for error depending upon the overage allowed as described above, the counters will be reduced to zero which will provide a signal stopping the conveyors and auxiliary equipment.

Whereas the preferred form of the invention has been shown and described herein, it should be realized that there may be many modifications, substitutions and alterations thereto.

The embodiments of the invention in which an exclusive property or privilege is claimed are defined as follows:

1. A system for use in detecting jams in a series of members of defined length moving along a predetermined path including pulse generating means for providing sequential pulses each representative of a unit of length, a plurality of counting means each having a preset number therein representative of the defined length of a member plus an additional fixed length substantially less than that of a member, an equal number of sensing means adjacent said path and each providing a given output during the period it senses a member moving on said path, each sensing means being connected to a counting means, said pulse generating means being connected to each of said counting means with pulses from said pulse generating means changing the count in a counting means during the period that a member is sensed by the connected sensing means, a jam condition being indicated when the number of counted pulses during the period a member is sensed at a sensing means equals said preset number.

2. The system of claim 1 further characterized in that the preset number in a counting means is reduced by each pulse from said pulse generating means during the period a member is sensed at a connected sensing means.

3. The system of claim 1 further characterized by and including alarm means connected to the output of said counting means, and a gate connected between each sensing means and each counting means and having inputs from said sensing means and said alarm means to reset said counting means when either said alarm means is activated or there is no member present at said sensing means.

4. The system of claim 1 further characterized in that each sensing means includes a photosensitive device and an operational amplifier.

* * * * *

Disclaimer 4,258,250.—*Stephen R. Schmidt,* Chicago, Ill. JAM DETECTOR. Patent dated Mar. 24, 1981. Disclaimer filed Jan. 9, 1984, by the assignee, *Copar Corp.*

Hereby enters this disclaimer to all claims of said patent.

[*Official Gazette February 28, 1984.*]